(No Model.)
W. A. FOSTER.
OIL CUP.
No. 298,963. Patented May 20, 1884.
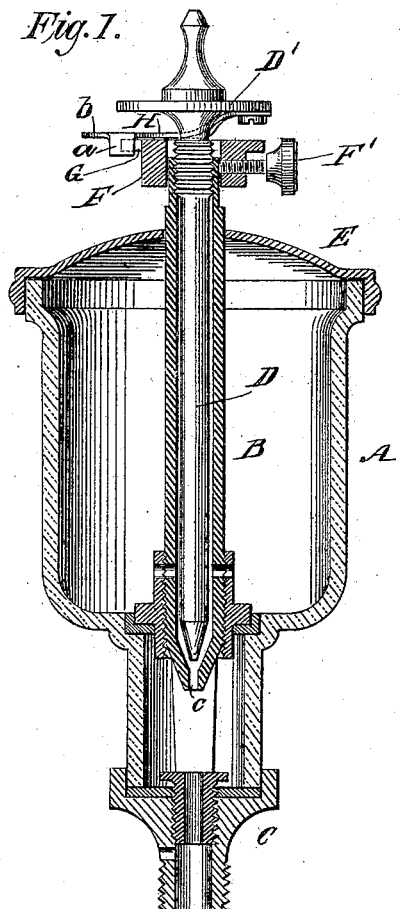
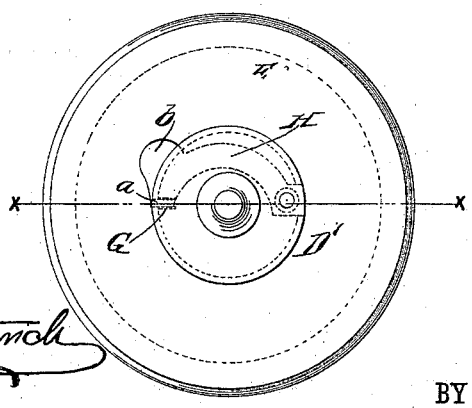
WITNESSES:
Gustave Dieterich
C. Sedgwick
INVENTOR:
W. A. Foster
BY Munn & Co.
ATTORNEYS.

UNITED STATES PATENT OFFICE.

WILLIAM A. FOSTER, OF FITCHBURG, MASSACHUSETTS.

OIL-CUP.

SPECIFICATION forming part of Letters Patent No. 298,963, dated May 20, 1884.

Application filed March 8, 1884. (No model.)

*To all whom it may concern:*

Be it known that I, WILLIAM A. FOSTER, of Fitchburg, in the county of Worcester and State of Massachusetts, have invented certain new and useful Improvements in Oil-Cups, of which the following is a full, clear, and exact description.

My invention relates to that class of oil-cups wherein an adjustable valve-spindle is employed for stopping or regulating the flow of oil from the cup to the bearing; and the invention consists, principally, of a latch or locking attachment for holding the spindle, so that when it is set for any desired rate of feed and afterward closed it can be easily opened to feed, as before.

The invention also consists of the construction, arrangement, and combination of parts, all as hereinafter described and claimed.

Reference is to be had to the accompanying drawings, forming part of this specification, in which similar letters of reference indicate corresponding parts in both the figures.

Figure 1 is a sectional elevation of an oil-cup having my invention applied thereto, on line *x x* of Fig. 2. Fig. 2 is a plan view of the same.

The oil-cup A, with its conical and apertured feed tube or sleeve B, journal attachment C, and adjustable valve or spindle D, placed in the tube B, for stopping and regulating the flow of oil from the cup, may be of the ordinary or of any approved construction. Upon the upper end of the tube B, which reaches through and above the cap E, is placed the ring F, which is provided with the set-screw F', for securing it to the tube, and is formed with the notch, slot, or other detent, G, with which the lip *a* of the spring H, secured to the head D' of the spindle D, is adapted to engage. The spring H is formed with the side piece, *b*, by which the lip *a* may be raised out of engagement with the slot G when the spindle or valve D is to be screwed down into the tube B for stopping the flow of oil from the oil-cup.

In use the spindle D will first be adjusted to permit the desired flow of oil. Then the ring F, with the lip *a* resting in slot G, will be made fast to the tube B by turning the set-screw F'. When it is desired to cut off the flow of oil from the oil-cup, the lip *a* will be raised out of the notch G and the spindle or valve D turned to close the orifice *c*, in the ordinary manner.

When it is desired to start the feed of oil again, the valve or spindle D will be turned until the lip *a* drops into the slot or notch G, thus causing the cup to feed with the same speed as before it was stopped, so that by this means no difficulty will be experienced in causing the feed to be always uniform.

Having thus described my invention, I claim as new and desire to secure by Letters Patent—

1. The ring F, placed upon the tube B, and formed with a suitable detent, in combination with the spring H, secured to the spindle or valve D, and arranged to engage with the detent, substantially as and for the purposes set forth.

2. The ring F, formed with slot G, and provided with set-screw F', in combination with the spring H, formed with lip *a*, and adapted to be secured to the spindle D, substantially as and for the purposes set forth.

WILLIAM A. FOSTER.

Witnesses:
MARY E. HAYDEN,
IDA M. DWYER.